US011125443B2

(12) United States Patent
Cowan

(10) Patent No.: US 11,125,443 B2
(45) Date of Patent: Sep. 21, 2021

(54) METHOD AND APPARATUS FOR A MANUAL GAS VALVE

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 305 days.

(21) Appl. No.: 16/196,563

(22) Filed: Nov. 20, 2018

(65) Prior Publication Data
US 2020/0158347 A1   May 21, 2020

(51) Int. Cl.
| F24C 3/12 | (2006.01) |
| F16K 15/06 | (2006.01) |
| F16K 17/04 | (2006.01) |
| F16K 1/32 | (2006.01) |
| F16K 5/02 | (2006.01) |

(52) U.S. Cl.
CPC ............... *F24C 3/126* (2013.01); *F16K 1/32* (2013.01); *F16K 5/0242* (2013.01); *F16K 15/063* (2013.01); *F16K 17/04* (2013.01)

(58) Field of Classification Search
CPC ...... F24C 3/126; F24C 3/122; F23N 2235/02; F23N 2235/12; F23N 1/007; F16K 5/04; F16K 15/025; F16K 25/04; F16K 5/0242; F16K 15/063; F16K 17/04; F16K 1/32; F23K 5/005
USPC ..................................... 431/81; 251/157, 160
See application file for complete search history.

(56) References Cited

U.S. PATENT DOCUMENTS

| 2,834,367 A * | 5/1958 | Mihm .................... F23N 5/107 |
| | | 137/66 |
| 4,181,611 A | 1/1980 | Rubenstein et al. |
| 4,262,695 A | 4/1981 | Iizumi |
| 4,707,279 A | 11/1987 | Walls |
| 5,836,296 A * | 11/1998 | Hillis ..................... F23K 5/005 |
| | | 126/39 G |
| 7,159,613 B2 | 1/2007 | Thoms et al. |
| 7,174,799 B2 | 2/2007 | Yoshida et al. |
| 9,163,738 B1 * | 10/2015 | LaCroix ................ F16K 24/04 |
| 9,441,749 B1 * | 9/2016 | LaCroix ................ F16K 24/06 |
| 9,970,399 B2 * | 5/2018 | Marechal .................. F16K 1/32 |
| 10,024,439 B2 * | 7/2018 | Young ................ F16K 37/0025 |

(Continued)

FOREIGN PATENT DOCUMENTS

| CN | 1074520 A | 7/1993 |
| CN | 201416650 Y | 3/2010 |
| CN | 204942137 U | 1/2016 |

(Continued)

OTHER PUBLICATIONS

International Search Report and Written Opinion in application No. PCT/CN2019/117041, dated Jan. 21, 2020.

*Primary Examiner* — David J Laux
(74) *Attorney, Agent, or Firm* — Middleton Reutlinger

(57) ABSTRACT

A method and apparatus for a manual gas valve. The manual gas valve may include at least one internal spring and a valve plug. The internal spring may be independent from an external spring and a valve stem. The internal spring may be positioned in a constant installed height. The internal spring includes a constant spring force applied to the valve plug. The one or more manual gas valves may be used in a variety of applications.

13 Claims, 5 Drawing Sheets

(56) References Cited

U.S. PATENT DOCUMENTS

| | | | |
|---|---|---|---|
| 2007/0056632 A1 | | 3/2007 | Cheong |
| 2015/0198126 A1* | | 7/2015 | Marechal ............. F02M 59/366 251/129.19 |

FOREIGN PATENT DOCUMENTS

| | | | | | |
|---|---|---|---|---|---|
| CN | 106678373 | A | | 5/2017 | |
| CN | 107631065 | A | | 1/2018 | |
| DE | 3504878 | A1 | | 8/1986 | |
| DE | 4127568 | A1 | | 2/1993 | |
| GB | 579391 | A | * | 8/1946 | ............. F16K 41/00 |
| GB | 579391 | A | | 8/1946 | |
| KR | 20130054894 | A | | 5/2013 | |
| WO | WO2005038315 | A1 | | 4/2005 | |
| WO | WO2005090762 | A1 | | 9/2005 | |

* cited by examiner

METHOD AND APPARATUS FOR A MANUAL GAS VALVE

BACKGROUND

The present embodiments relate to a method and apparatus for a manual gas valve integrated into a cooking appliance.

As shown in FIGS. 1 and 2, a typical manual gas burner valve 1 for a cooking appliance includes an internal spring 2 that contacts both a valve plug 3 and the valve stem 4. The internal spring 2, the valve plug 3, the valve stem 4, and an external spring 5 are illustrated in a closed configuration (FIG. 1) for the manual gas burner valve 1, as compared to an open configuration (FIG. 2). The internal spring 2 functions to maintain the gas seal of the valve plug 3, provides the push force of the valve stem 4, and keeps the valve stem 4 pushed out to a desired position (e.g. off or other positions). In the valve's open position, the external spring 5 may be used on the valve stem 4 to augment the push force of the valve stem 4. The internal spring 2 may be designed to provide the minimum force when the valve is off and the stem is pushed/returned out (i.e. least compression, with the valve stem fully out). As illustrated in the closed position of FIG. 1, the internal spring 2 has a first spring force, F1, applied to the valve plug 3 when positioned in an installed height H1 within the interior cavity of the housing (e.g. measured between the valve stem 4 and the valve plug 3). In this closed position, the internal spring includes a first length L1 corresponding to the installed height H1 in the closed position. Therefore, as shown in the open position in FIG. 2, when the valve 1 is cycled towards or in the open position, the spring force F2 on the valve plug 3 is higher than necessary and/or spring force F1 because the pushed valve stem 4 is compressing the internal spring 2 more (e.g. decreases the length L2 and correspondingly the installed height H2). However, this practice of varying the spring force and height/length by operating the valve stem 4 may reduce the cycle life of the valve and/or internal spring, push grease out of contact with the valve plug (e.g. decreases lubrication and seal effectiveness), and makes wear on the gas valve unpredictable and less consistent. Thus, there is a need to increase the cycle life of the gas valve, maintaining lower and substantially constant forces on the valve plug, reduce the loss of grease, and may make the cycle life and wear of the gas valve or portions thereof more predictable and more consistent.

SUMMARY

In some embodiments, a manual gas valve for a cooking appliance may include a valve housing having a cap and a plug housing. In various embodiments, the manual gas valve may include a valve plug and an internal spring positioned within the valve housing. Moreover, in some embodiments, the manual gas valve may include a valve stem extending through the cap and into the valve housing to rotate the valve plug relative to the valve housing between an opened position and a closed position. In various embodiments, the manual gas valve may include an external spring engaging the valve stem. In some embodiments, the internal spring may include a first end and a second end. Moreover, in various embodiments, the first end may engage the valve plug and the second end may engage the cap to apply a constant force against the valve plug independent of both the opened position and the closed position of the valve stem.

In addition, in some embodiments, the constant force may be independent of the external spring. In various embodiments, the internal spring may be a conical spring having a larger diameter adjacent to the cap. In some embodiments, the valve stem may extend through the internal spring to engage the valve plug. Moreover, in some embodiments, the manual gas valve may include an inlet engaging a gas manifold and an outlet in fluid communication with one or more gas burners. In various embodiments, the manual gas valve may include a gas range with one or more burners operated by one or more of the manual gas valves. In some embodiments, the first end and the second end of the internal spring may remain in contact with the valve plug and the cap, respectively, during linear movement of the valve stem relative to the valve housing.

In some embodiments, a manual gas valve for a cooking appliance may include a valve housing having an inlet and an outlet. In various embodiments, the manual gas valve may include a valve plug configured to rotate within the valve housing. Moreover, in some embodiments, the inlet may be in fluid communication with the outlet in one or more rotational positions of the valve plug. In various embodiments, the manual gas valve may include one or more internal springs positioned in a constant installed height and engages the valve plug within the valve housing. In various embodiments, the manual gas valve may include a valve stem operably engaging the valve plug through the valve housing to selectively control the one or more rotational positions of the valve plug.

In addition, in some embodiments, the manual gas valve may include one or more external springs providing resistance to the valve stem in one or more directions. In various embodiments, the one or more internal springs may apply a first force to the valve plug separate from a second force the one or more external springs applies to the valve stem. In some embodiments, the one or more internal springs may include a first end and a second end, wherein the first end engages the valve plug and the second end engages the valve housing. In addition, in some embodiments, the valve housing may include a cap and a plug housing receiving the valve plug, wherein the second end of one or more internal springs engages the cap. In various embodiments, the one or more internal springs may be a single compression spring having a constant spring force within the constant installed height.

In some embodiments, a gas range appliance may include one or more gas burners. In various embodiments, the appliance may include at least one gas manifold. In some embodiments, one or more manual gas valves may be configured to be positioned between an opened configuration and a closed configuration. Moreover, in various embodiments, at least one of the one or more manual gas valves may have a valve stem, a valve plug, an internal spring, and a valve housing. In some embodiments, the internal spring may include a first spring force against the valve plug within the valve housing. In various embodiments, at least one manual gas valve may be in fluid communication with at least one gas manifold and one or more gas burners when in the opened configuration and may be out of fluid communication with the one or more gas burners in the closed configuration. Moreover, in some embodiments, the first spring force may be the same when the at least one manual gas valve is in each one of the opened configuration and the closed configuration.

In addition, in some embodiments, the valve stem may extend through the internal spring and engage the valve plug when in the opened configuration. In various embodiments, the internal spring may be positioned within a constant installed height. In some embodiments, the internal spring may engage the valve plug and an interior surface of the valve housing. In various embodiments, the internal spring may be conical in shape. In addition, in some embodiments, the first spring force may be constant when the valve stem translates relative to the valve housing. In some embodiments, the appliance may include an external spring engaging the valve stem with a second spring force, wherein the first spring force is independent of the second spring force.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
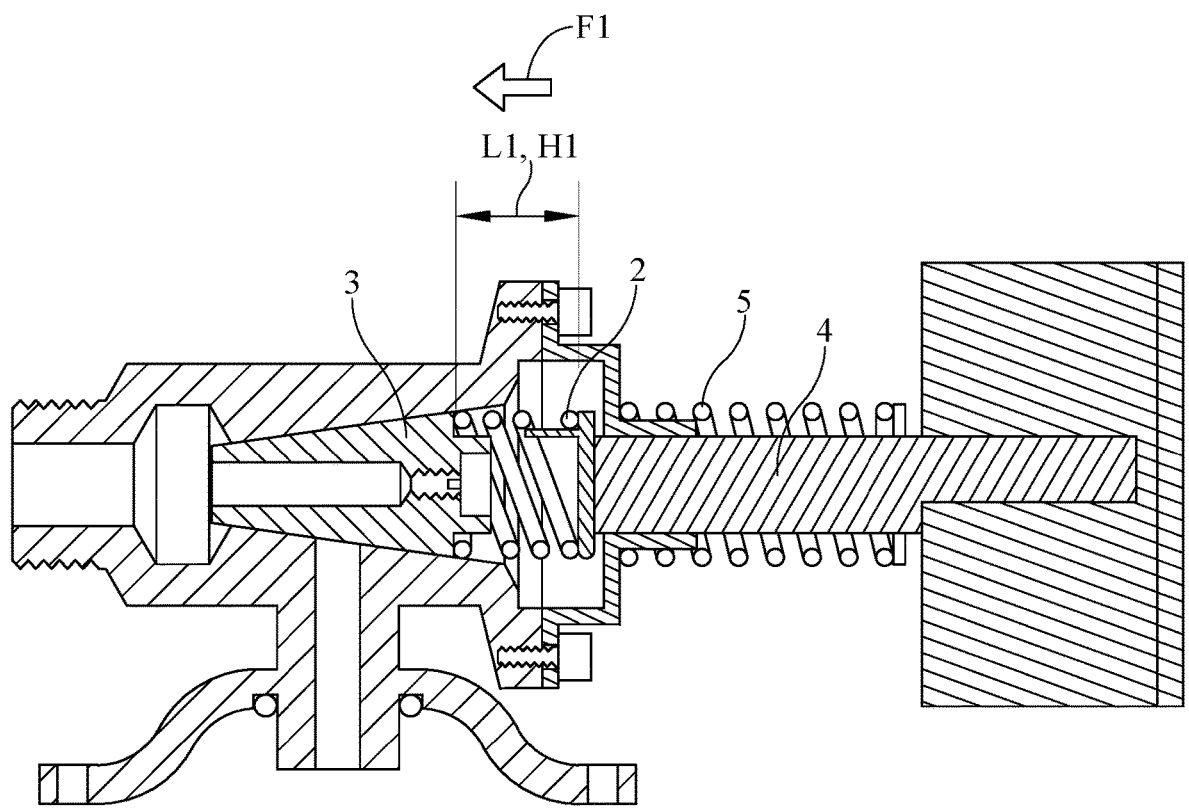
FIG. 1 is a sectional view of a manual gas valve of the prior art illustrating a closed configuration with an internal spring applying a first spring force to the valve plug within an installed first height.
Figure 2:
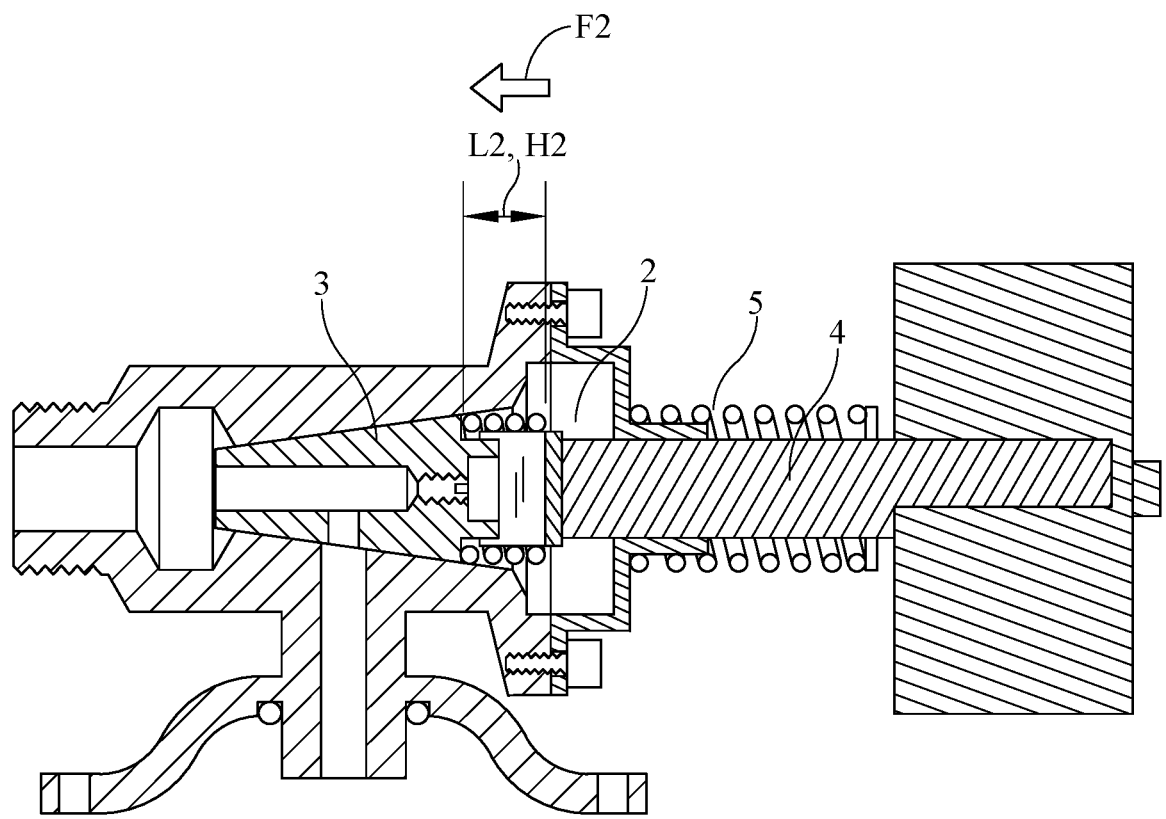
FIG. 2 is a sectional view of a manual gas valve of the prior art illustrating an opened configuration with an internal spring applying a larger second spring force to the valve plug within a smaller installed second height, as compared to the first spring force illustrated in the closed manual gas valve of FIG. 1.
Figure 3:
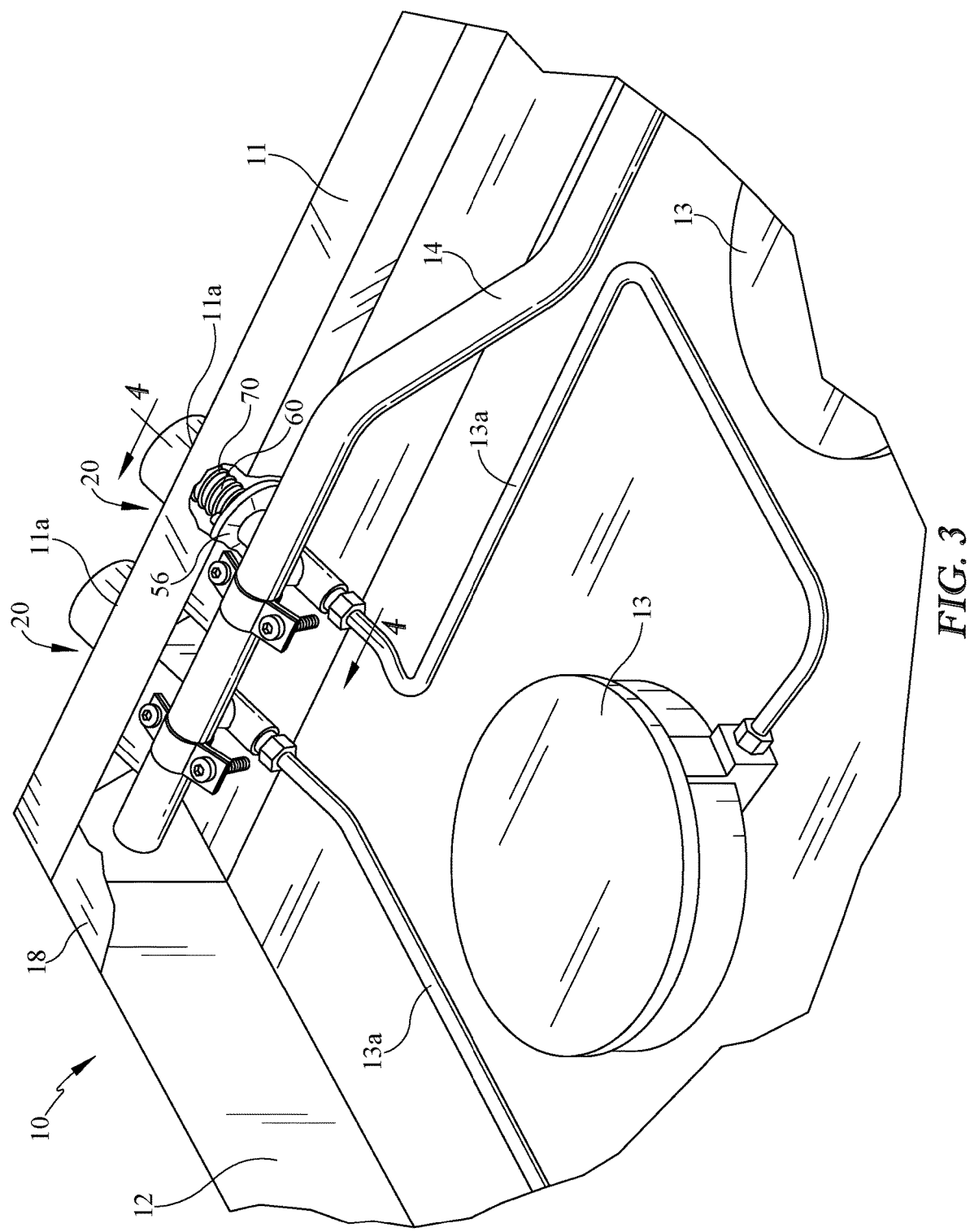
FIG. 3 is a perspective view of one embodiment of a manual gas valve with portions of the cooking surface and housing of the cooking appliance broken away illustrating one embodiment of gas flow structure in fluid communication with one or more gas burners.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a residential cooking appliance such as cooking appliance 10, such as the type that may be used in single-family or multi-family dwellings, or in other similar applications. However, it will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations. Implementation of the herein-described techniques within gas top burner(s), oven burner, broil burner, gas range, slide-in oven, freestanding oven, gas cooktop, gas countertop range, etc. using a manual gas valve would be well within the abilities of one of ordinary skill in the art having the benefit of the instant disclosure, so the embodiments are not limited to the freestanding oven implementation discussed further herein. Moreover, the herein-described techniques may be used in manual gas thermostats or other applications with plug-type gas valves such as, but is not limited to, gas furnaces, gas water heaters, gas fireplaces/logs, and gas space heaters.

As shown in the Figures, one or more manual gas valves 20 may be used within a home cooking appliance 10, such as but not limited to a freestanding cooking range, has a housing 12 and a cooking compartment (not shown), such as a baking oven, convection oven, steam oven, warming drawer and the like, in the housing 12 and accessible through a door or drawer (not shown). In the embodiment shown, the appliance 10 is a gas range, with the manual gas valve(s) 20 in fluid communication with at least one downstream gas burner head 13 via channels/tubes 13a. The manual gas valve 20 may engage at least one gas manifold 14 in fluid communication with the gas, liquid, or fuel supplied to the appliance 10. The appliance 10 includes a cooktop surface 18 on a top of the housing 12. In some implementations, the manual gas valves 20 may be positioned within a control panel 11 within the cooking appliance 10 and have a plurality of control knobs or controls 11a for controlling the gas burner heads 13, manual gas valves 20, gas burner characteristics, and/or cooking compartment, etc.

The one or more manual gas valves 20 include a constant internal spring force FI applied to the valve plug 40 within the valve housing 50 during the operating cycle(s) of the valve. The constant force or internal spring force FI is independent of the valve stem 60 and/or external spring forces FE1, FE2 when cycling/operating the valve 20 in one or more selected positions. Stated alternatively, the external spring force FE1, FE2 or forces created from the valve stem/external spring position does not combine with the internal spring force FI to seal the valve plug 40 during the one or more positions of the valve cycle. The internal spring 30 and the constant internal spring force FI is maintained at a constant installed length L. Further, the internal spring 30 is positioned in a constant installed height or space H between fixed structures within the interior cavity of the housing 50 (e.g. measured between the interior housing wall and the valve plug 40). The internal spring 30 may not be compressed and/or stretched by other structure (e.g. valve stem) of the valve during operation thereby maintaining the length L.

As shown in the Figures, the installed height H and the corresponding length L of the internal spring 30 is fixed during operation of the manual gas valve. In the opened configuration or position (FIG. 5), the valve 20 allows gas to flow from the manifold 14 through the valve 20/valve plug 40 and continue towards the burner 13. In the closed configuration or position (FIG. 4), the valve 20/valve plug 40 prevents gas flow downstream of the valve. Comparing the open positon of the valve in FIG. 5 to the closed position of the valve in FIG. 4, the internal spring 30 does not vary in the internal spring force FI directed against the valve plug 40. In the one embodiment shown, the length L of the internal spring and the installed height H does not change during valve operation. As shown in the FIG. 5, when in the opened position the valve stem 60 does not engage, interact, or interfere with the internal spring's length L or installed height H when translating and/or rotating during operation. The valve stem 60 may pass linearly through a portion of the internal spring 30 in some embodiments.

In one implementation as shown, the internal spring 30 and the valve plug 40 is positioned within the valve housing 50. In some embodiments, the valve housing 50 may include a plug housing 58 and a cap 56 defining the internal cavity receiving/positioning the valve plug 40 and internal spring 30. The valve plug 40 is sealed against the interior of the valve housing 50 or plug housing 58 with a thin layer of grease and by the constant internal spring force F1 applied from the internal spring 30. The valve plug 40 is rotated to one or more positions relative to the valve housing 50 to allow fluid communication between the valve housing inlet 54 and a valve housing outlet 52 (e.g. one or more closed (FIG. 4) and/or opened positions/flows (FIG. 5)). The valve housing inlet 54 is in fluid communication with the upstream gas manifold 14 and the valve housing outlet 52 is in fluid communication with the downstream one or more burners 13/channels 13a. The internal spring 30 is positioned within a fixed or constant installed height H or distance extending from the valve plug 40. A proximal or first end 32 of the internal spring 30 engages the valve plug 40 and the opposing distal or second end 34 engages the valve housing 50 (e.g. cap 56 or interior surface of the housing). More specifically, in some embodiments, the internal spring distal end 34 may engage the housing cap 56. The internal spring force FI is substantially constant when the internal spring force is independent of the external spring force and/or valve stem 60.

The internal spring 30 may be a variety of shapes, sizes, quantities, constructions, and positions within the valve housing 50 and still be within the scope of the invention. In the embodiment shown in the Figures, the internal spring 30 may be a conical spring having a larger diameter at the distal end 34 engaging the valve housing 50, plug housing 58, and/or cap 56. Moreover, the internal spring may be a cylindrical spring in some embodiments. In addition, for example, the internal spring may be wave washers, beam springs, and/or elastomeric parts. For example, the internal spring may be a single compression spring in some embodiments.

Figure 4:
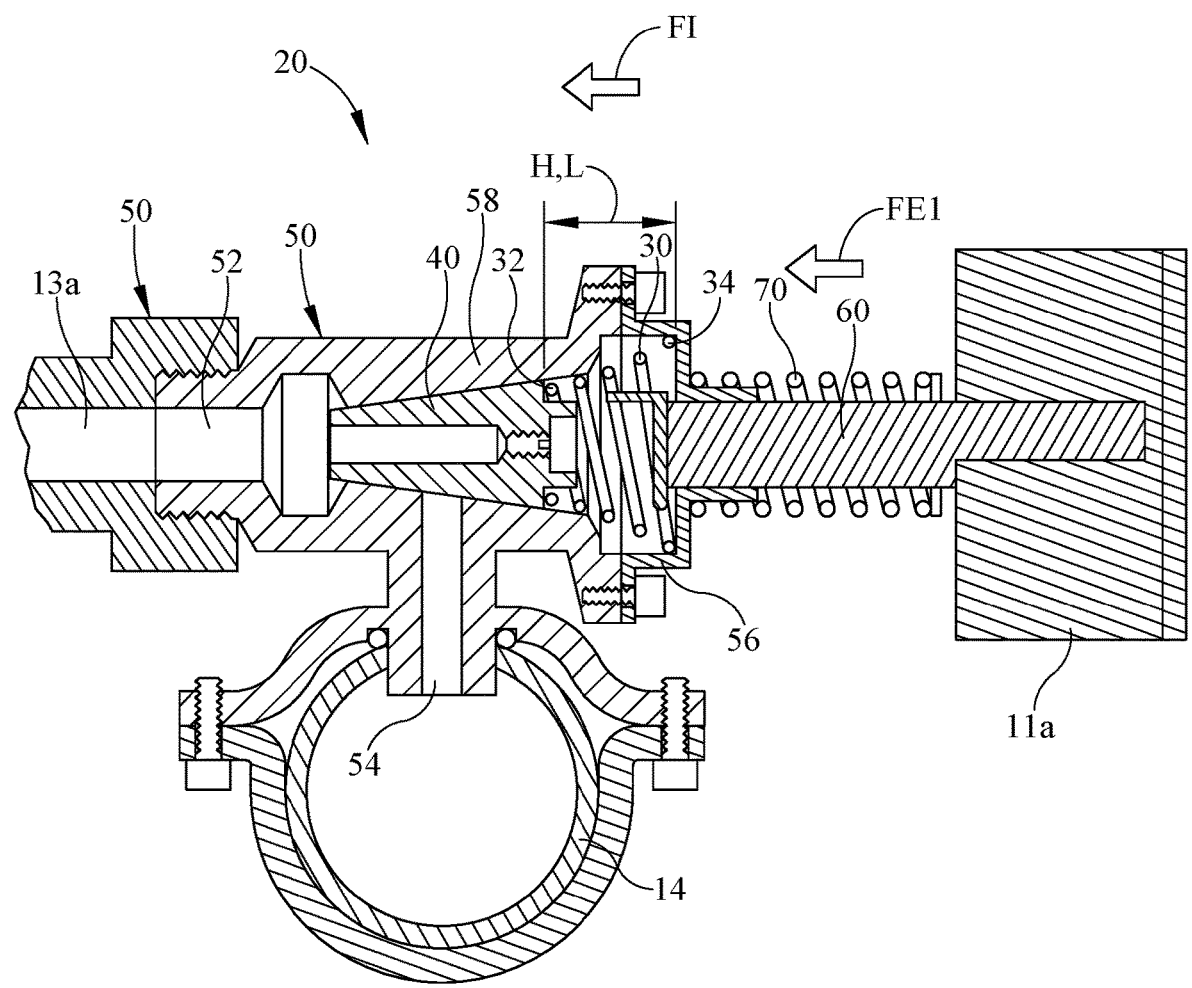
FIG. 4 is a sectional view of one embodiment of the manual gas valve in a closed position or configuration taken along line 4-4 of FIG. 3 illustrating the internal spring in a constant height/length within the valve housing and applying a spring force to the valve plug.
Figure 5:
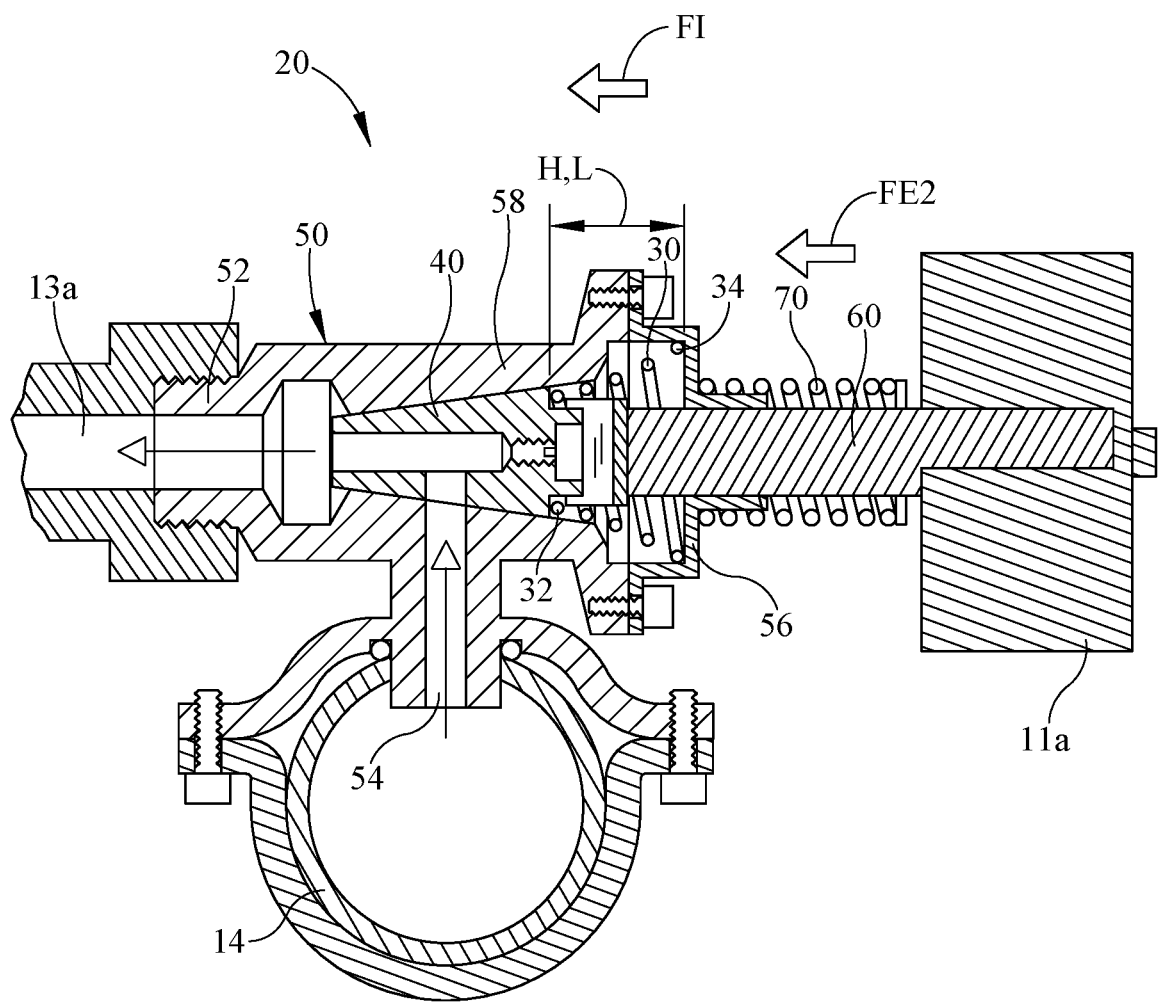
FIG. 5 is a sectional view of the embodiment of the manual gas valve in an opened position or configuration taken along line 4-4 of FIG. 3 illustrating the internal spring in the constant height/length and applying the same spring force to the valve plug independent of the valve stem, external spring, and/or cycle position.

The valve housing 50 (e.g. cap) is configured to receive the valve stem 60 extending therethrough to operably engage or rotate the valve plug 40 to selectively control the one or more rotational positions of the valve plug. In the one embodiment shown, the one or more external springs 70, if used, may control the external spring force FE1, FE2 of the valve stem/control knob independent of the internal spring 30. The secondary or external spring 70 engages the valve stem 60 and may apply the external force or resistance to the stem to resist inward linear movement as well as force the stem to return outward away from the housing (e.g. when the valve is opened and closed or stem operated in one or more directions). The external spring force of the external spring 70 increases when the manual gas valve 20 is positioned from the one or more closed positions (FIG. 4) to the one or more opened positions (FIG. 5) while the internal spring force FI of the internal spring 30 remains constant/independent. In the closed configuration, the external spring force FE1 of the external spring 70 shown in FIG. 4 is less than the external spring force FE2 of the external spring 70 in the opened configuration shown in FIG. 5. The external spring 70 decreases in length or is compressed by the valve stem 60 or user, in some embodiments, when operated from the closed positon to the opened position. Moreover, the valve stem 60 may be configured to be out of contact with and does not interfere with the internal spring 30 during its linear movement relative to the valve housing 50 during operation. As a result, the proximal end 32 and the distal end 34 of the internal spring 30 remains in contact with the valve plug 40 and housing 50 interior/cap 56 without changing the internal spring force FI applied to the valve plug 40.

In some embodiments, the valve stem 60 and/or knob 11a may be a two-step open (e.g. push and turn) to rotate the valve plug 40 into one or more open rotational positions. Moreover, in various embodiments, a one step off (e.g. rotation only) returns or rotates the valve plug to the closed positon.

In some embodiments, the valve stem 60 and external spring 70, if used, may be a variety of sizes, shapes, quantities, and constructions. For example, although not shown, the valve stem may have a stop or interference with a remaining portion of the valve housing or structure limiting the translational movement of the valve stem towards the opened and/or closed position(s).

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A manual gas valve for a cooking appliance comprising:
    a valve housing having a cap and a plug housing;
    a valve plug and an internal spring positioned within the valve housing;
    a valve stem extending through the cap and into the valve housing to rotate the valve plug relative to the valve housing between an opened position and a closed position; and
    an external spring engaging the valve stem;
    wherein the internal spring includes a first end and a second end, wherein the first end engages the valve plug and the second end engages the cap to apply a constant force against the valve plug independent of both the opened position and the closed position of the valve stem.

2. The manual gas valve of claim 1 wherein the constant force is independent of the external spring.

3. The manual gas valve of claim 1 wherein the internal spring is a conical spring having a larger diameter adjacent to the cap.

4. The manual gas valve of claim 1 wherein the valve stem extends through the internal spring to engage the valve plug.

5. The manual gas valve of claim 1 further comprising an inlet engaging a gas manifold and an outlet in fluid communication with one or more gas burners.

6. The manual gas valve of claim 1 further comprising a gas range with one or more burners operated by one or more of the manual gas valves.

7. The manual gas valve of claim 1 wherein the first end and the second end of the internal spring remain in contact with the valve plug and the cap, respectively, during linear movement of the valve stem relative to the valve housing.

8. A manual gas valve for a cooking appliance comprising:
    a valve housing having an inlet and an outlet;
    a valve plug configured to rotate within the valve housing wherein the inlet is in fluid communication with the outlet in one or more rotational positions of the valve plug;
    one or more internal springs positioned in a constant installed height and engaging the valve plug within the valve housing; and
    a valve stem operably engaging the valve plug through the valve housing to selectively control the one or more rotational positions of the valve plug.

9. The manual gas valve of claim 8 further comprising one or more external springs providing resistance to the valve stem in one or more directions.

10. The manual gas valve of claim 9 wherein the one or more internal springs apply a first force to the valve plug separate from a second force the one or more external springs applies to the valve stem.

11. The manual gas valve of claim 8 wherein the one or more internal springs include a first end and a second end, wherein the first end engages the valve plug and the second end engages the valve housing.

12. The manual gas valve of claim 11 wherein the valve housing includes a cap and a plug housing receiving the valve plug, wherein the second end of one or more internal springs engages the cap.

13. The manual gas valve of claim 8 wherein the one or more internal springs is a single compression spring having a constant spring force within the constant installed height.

* * * * *